Oct. 5, 1965     A. F. NICKOLAEV ETAL     3,209,472
ADJUSTABLE DRUM TYPE DITCHING EXCAVATOR
Filed April 29, 1963
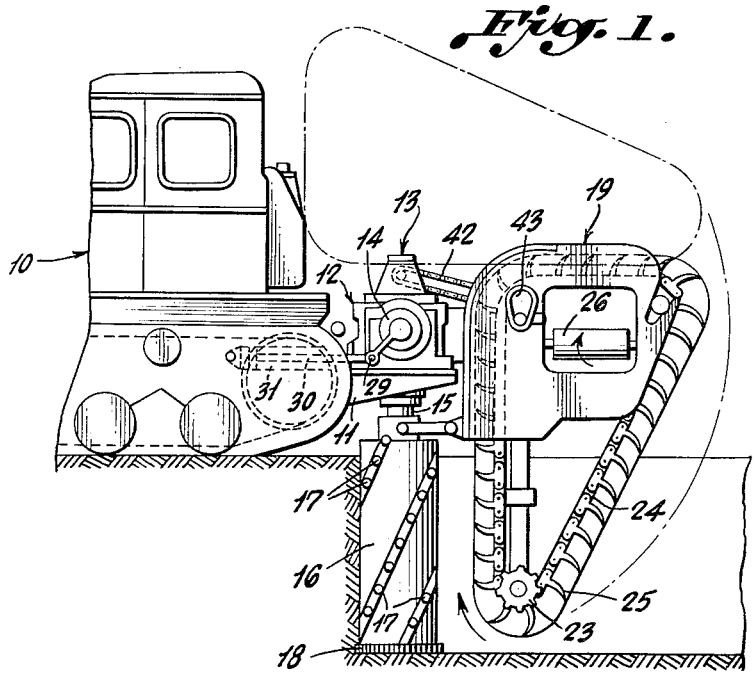
Fig. 1.
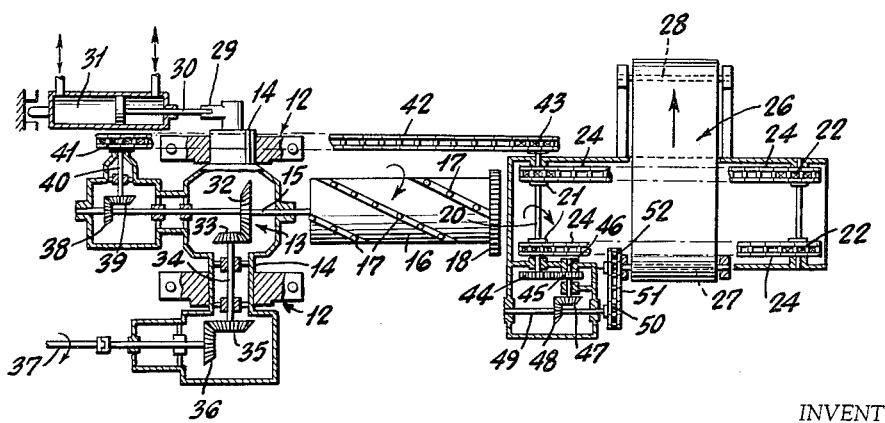
INVENTORS
A. F. NICKOLAEV
S. V. ROUKAVISHNIKOV
I. V. FEDIN
E. P. ARTEMENKO
BY Glascock, Downing & Seebold
ATTORNEYS

# United States Patent Office 3,209,472
Patented Oct. 5, 1965

3,209,472
ADJUSTABLE DRUM TYPE DITCHING EXCAVATOR
Arkadii Fedorovich Nickolaev, Gorky Str. 147A, Apt. 8; Sergei Vladimirovich Roukavishnikov, Nesterova Str. 35, Apt. 3; and Ivan Vasilievich Fedin, Korotky per. 5, Apt. 3, all of Gorky, U.S.S.R.; and Evguenii Petrovich Artemenko, Verkhniaia Pervomaiskaia Str. 63, Korp. I, Apt. 57, Moscow, U.S.S.R.
Filed Apr. 29, 1963, Ser. No. 276,340
3 Claims. (Cl. 37—80)

This invention relates to earth-working equipment and more particularly to a ditching excavator mounted on a self-propelled tractor and which is primarily intended to be utilized for excavating ditches in relatively hard or frozen soil.

Numerous attempts have been made to overcome the problems present in excavating ditches in hard or frozen soil, but many of these prior art machines removed the soil in the form of relatively large clods or masses of earth thereby necessitating subsequent crushing thereof and moreover these prior art machines in many instances, failed to provide a ditch with straight vertical sidewalls and a flat bottom which is necessary to facilitate subsequent operations in the ditch.

It is accordingly an object of the present invention to provide a ditching excavator mounted on a self-propelled tractor and which will efficiently operate to excavate a ditch in hard or frozen soil.

A further object of the invention is the provision of a ditching excavator mounted on a self-propelled tractor which will efficiently operate to excavate a ditch in hard or frozen soil and at the same time, remove all of the soil from the ditch and deposit the same to one side of the ditch being excavated.

A still further object of the invention is the provision of a ditching excavator mounted on a self-propelled tractor and in which means is provided for moving the excavating mechanism from a substantially vertical operative position to a substantially horizontal inoperative position to facilitate movement of the equipment from one location to another.

Another object of the invention is the provision of a ditching excavator mounted on a self-propelled tractor and including earth cutting means, as well as a conveyor for removing soil from the ditch being excavated and a second conveyor for depositing such soil to the side of the ditch, the earth cutting means, as well as both of the excavators being operated from the power take-off shaft of the tractor.

A further object of the invention is the provision of a ditching excavator mounted on a self-propelled tractor and including soil cutting means, as well as conveyors for removing the soil from the ditch and depositing the same to one side of the ditch, the cutting means, as well as the conveyors providing a unitary structure mounted on the tractor for movement from an operative to an inoperative position, such movement being accomplished by a single means, such as a hydraulic cylinder.

A still further object of the invention is the provision of a ditching excavator mounted on a self-propelled tractor and including soil cutting means in the form of a rotary drum having soil cutters thereon and further including peripheral cutting means located at the lower end of the drum to provide a substantially flat bottom in the ditch being excavated.

Further objects and advantages of the invention will be apparent from the following description taken in conjunction with the accompanying drawing wherein:

FIG. 1 is a side elevational view showing a ditching excavator constructed in accordance with this invention and with such excavating equipment shown in operative position in full lines and in inoperative position in dotted lines; and FIG. 2 a diagrammatic view showing the drive means from the power take-off of the tractor to the operating portions of the equipment, as well as the means for moving the soil cutting and conveying mechanism from operative to inoperative position.

With continued reference to the drawing, there is shown a ditching excavator constructed in accordance with this invention and mounted on a conventional self-propelled tractor 10 having a mounting bracket 11 thereon. The excavating equipment comprises a base 12 mounted on the bracket 11 and a head 13 is provided with trunnions 14 which are rotatably mounted in the base 12 for movement about a substantially horizontal axis. Rotatably carried by the head 13 is a shaft 15 fixed to a drum 16 having spirally disposed soil cutters 17 projecting from the surface thereof. On the end of the drum 16 opposite to the head 13 there are provided peripherally arranged cutters 18, the purpose of which will be later described.

Also mounted on the head 13 for movement therewith about a horizontal axis, is a frame 19 and such frame is provided with a shaft 20 having sprockets 21 thereon and also rotatably mounted on the frame 19 are idler sprockets 22 and 23. Trained around the sprockets 21, 22 and 23 are a pair of spaced chains 24 having buckets 25 mounted thereon to provide a bucket-type conveyor and as clearly seen in FIG. 1, such conveyor extends substantially parallel to the drum 16 and terminates slightly inwardly of the peripheral cutters 18 on the drum 16.

Also carried by the frame 19 is a transverse belt-type endless conveyor 26 which is mounted on a drive shaft 27 rotatably carried by the frame 19 and an idler shaft 28 also carried by the frame 19. As clearly seen in FIG. 2, the belt conveyor 26 extends transversely of the bucket conveyor and serves a purpose to be presently described.

As clearly shown in FIGS. 1 and 2, a crank arm 29 is fixed to one of the trunnions 14 and the piston rod 30 of a hydraulic cylinder 31 is pivotally connected to the crank arm 29. Consequently, it will be seen that operation of the hydraulic cylinder 31 serves to rotate the head 13 about a horizontal axis to provide swinging movement for the drum 16 and frame 19, together with the conveyors carried thereby from the operative vertical position shown in FIG. 1 in full lines to an inoperative position shown in dotted lines in FIG. 1 which serves to facilitate transportation of the equipment by means of the tractor 10 from one location to another.

As clearly shown in FIG. 2, a bevel gear 32 is fixed to the shaft 15 carrying the drum 16 and the gear 32 meshes with a bevel gear 33 fixed to a transverse shaft 34 extending through one of the trunnions 14. The shaft 34 is provided with a second bevel gear 35 which meshes with a bevel gear 36 fixed to a shaft 37 which is connected to the power take-off shaft of the tractor 10 in order to provide driving power for the excavating equipment.

A bevel gear 38 is fixed to the shaft 15 and meshes with a bevel gear 39 fixed to a shaft 40 which serves to drive a sprocket 41 mounted thereon. A chain 42 is trained over the sprocket 41 and also over a sprocket 43 fixed to the shaft 20 which serves to drive the chain 24 of the bucket conveyor. A spur gear 44 on the shaft 20 drives another spur gear 45 fixed to a shaft 46 which carries a bevel gear 47 meshing with a bevel gear 48 fixed on a shaft 49 which carries a sprocket 50. A chain 51 connects sprocket 50 with a sprocket 52 mounted on the shaft 27 which serves to drive the endless belt conveyor 26. Consequently, it will be seen that upon rotation of the shaft 37 by means of the power take-off shaft of the tractor 10 the soil cutting drum 16 will be driven as will also the bucket-type conveyor and the endless belt conveyor 26.

In operation, the ditching excavator of this invention is moved to the desired location by means of the tractor 10 and the hydraulic cylinder 31 is operated to move the excavating equipment from the inoperative position shown in dotted lines in FIG. 1 toward the operative position shown in full lines in FIG. 1 and during such movement the drum 16 rotates and cuts the soil in engagement therewith. At the same time, the bucket-type excavator moves downwardly into the excavation formed by the cutting drum 16 and the bucket-type excavator serves to remove soil and deposit the same on the belt conveyor 26 which carries such soil transversely and deposits the same to the side of the ditch being excavated. As clearly shown in FIG. 1, the peripheral cutters 18 on the drum 16 serve to cut a substantially flat bottom 53 in the ditch being excavated.

It will be seen that by the above described invention there has been provided a ditching excavator which may be conveniently moved from place to place by means of a self-propelled tractor on which the same is mounted and the equipment will efficiently operate to excavate a ditch in hard or frozen soil and substantially pulverize such soil to be removed and deposited to one side of the ditch by the conveyors mounted on the excavating equipment. All of the equipment is driven from a single drive shaft coupled to the power take-off shaft of the tractor on which the equipment is mounted and furthermore, movement of the equipment from operative to inoperative position is accomplished by a single means, such as a hydraulic cylinder as shown.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A ditching excavator for mounting on a tractor having a power take-off and a mounting bracket, said excavator comprising a head mounted on said bracket, an earth cutting drum mounted at one end on said head for axial rotation and for swinging movement about a horizontal axis, spirally disposed earth cutters on the surface of said drum, a frame mounted on said head for swinging movement about said horizontal axis, an endless bucket-type conveyor carried by said frame with a portion of said conveyor disposed substantially parallel to said drum and spaced therefrom longitudinally of a ditch to be excavated, an endless belt conveyor mounted on said frame to receive material from said bucket conveyor and projecting transversely to the side of a ditch to be excavated, driving connections between said belt conveyor, said bucket conveyor and said drum, driving connections between said drum and the power take-off of said tractor and means to simultaneously move said drum and said frame about said horizontal axis from an operative position with the axis of said drum substantially vertical to an inoperative position with the axis of said drum substantially horizontal.

2. A ditching excavator as defined in claim 1, in which said drum is provided on the end opposite said head with circumferentially disposed cutters to cut a substantially flat bottom in the ditch to be excavated.

3. A ditching excavator as defined in claim 1, in which the means to simultaneously move said drum and said frame about said horizontal axis comprises a hydraulic cylinder.

References Cited by the Examiner

UNITED STATES PATENTS

| 799,753 | 9/05 | O'Connor | 37—82 |
| 1,045,834 | 12/12 | Grey | 37—82 |
| 2,417,313 | 3/47 | MacKinnon | 37—81 |
| 2,430,048 | 11/47 | Engel | 37—81 |
| 2,817,911 | 12/57 | Owen | 37—90 |
| 3,054,199 | 9/62 | Penote | 37—90 |

FOREIGN PATENTS

| 37,812 | 11/30 | France. |
| 10,483 | of 1845 | Great Britain. |
| 138,627 | 9/60 | Russia. |

BENJAMIN HERSH, *Primary Examiner.*